United States Patent [19]

Colbaugh et al.

[11] Patent Number: 4,666,102

[45] Date of Patent: May 19, 1987

[54] CABLE DISPENSING AND TAKE-UP APPARATUS

[75] Inventors: Michael E. Colbaugh, Trafford; Rodney N. Zeigler, Monroeville; Theodore J. Batt, Penn Hills, all of Pa.

[73] Assignee: Westinghouse Electric Corp., Pittsburgh, Pa.

[21] Appl. No.: 778,949

[22] Filed: Sep. 23, 1985

[51] Int. Cl.$^4$ ............... B65H 59/38; B65H 75/42; H02G 1/06

[52] U.S. Cl. ............... 242/86.5 R; 242/86.51; 242/86.8; 254/134.3 R

[58] Field of Search ............ 242/75.51, 86.5 R, 86.8, 242/86.51, 45; 254/134.3 R, 333

[56] References Cited

U.S. PATENT DOCUMENTS

| | | | |
|---|---|---|---|
| 676,994 | 6/1901 | O'Keefe | 254/333 |
| 2,690,884 | 10/1954 | Beck | 242/86.51 |
| 3,650,490 | 3/1972 | Saunders | 242/75.51 X |
| 3,876,183 | 4/1975 | Strout et al. | 254/333 X |
| 4,108,264 | 8/1978 | Tonaka | 242/86.51 X |
| 4,511,100 | 4/1985 | Oetringhaus | 242/86.51 |
| 4,583,700 | 4/1986 | Tschurbanoff | 242/86.51 |

OTHER PUBLICATIONS

Meyer et al., "Automatic Construction of Fixtures for Cable Laying", (May, 1983), Abstract.

Brezovec, "Shaft Mines can get Power Without Armor", (Feb., 1984), Abstract.

Yoshida et al., "Automatic Close Pack Layer Winding Machine" (Nov., 1978), Abstract.

Kono, "Microprocessor Controlled Fiber Optic Cable Winding Machine" (Oct., 1981), Abstract.

Leoser et al., "Tactical Expendable Device" (May, 1982), Abstract.

Primary Examiner—Stuart S. Levy
Assistant Examiner—Joseph J. Hail, III
Attorney, Agent, or Firm—Daniel C. Abeles

[57] ABSTRACT

An apparatus for automatically dispensing and taking-up a flexible communications cable such as an optical fiber includes a motor-driven reel which is mounted on a movable member, such as a vehicle. The fiber passes through a pivotably mounted tension control arm, whose angular position is detected to control the motor. Depending on the position of the tension control arm, the reel may be rotated in one direction to relieve fiber tension, it may be rotated in the opposite direction to take-up slack, or it may remain quiescent. The reel is mounted on a pipe which channels the inner end of the fiber to a rotary optical coupler, thereby permitting the fiber to be used for optical communication as the vehicle moves. The level-winding mechanism similar to that in a fishing reel may be used to control the windings on the reel, and a pivotably mounted plate may be pressed against the upper layer of fiber on the reel in order to keep it from unraveling.

20 Claims, 8 Drawing Figures

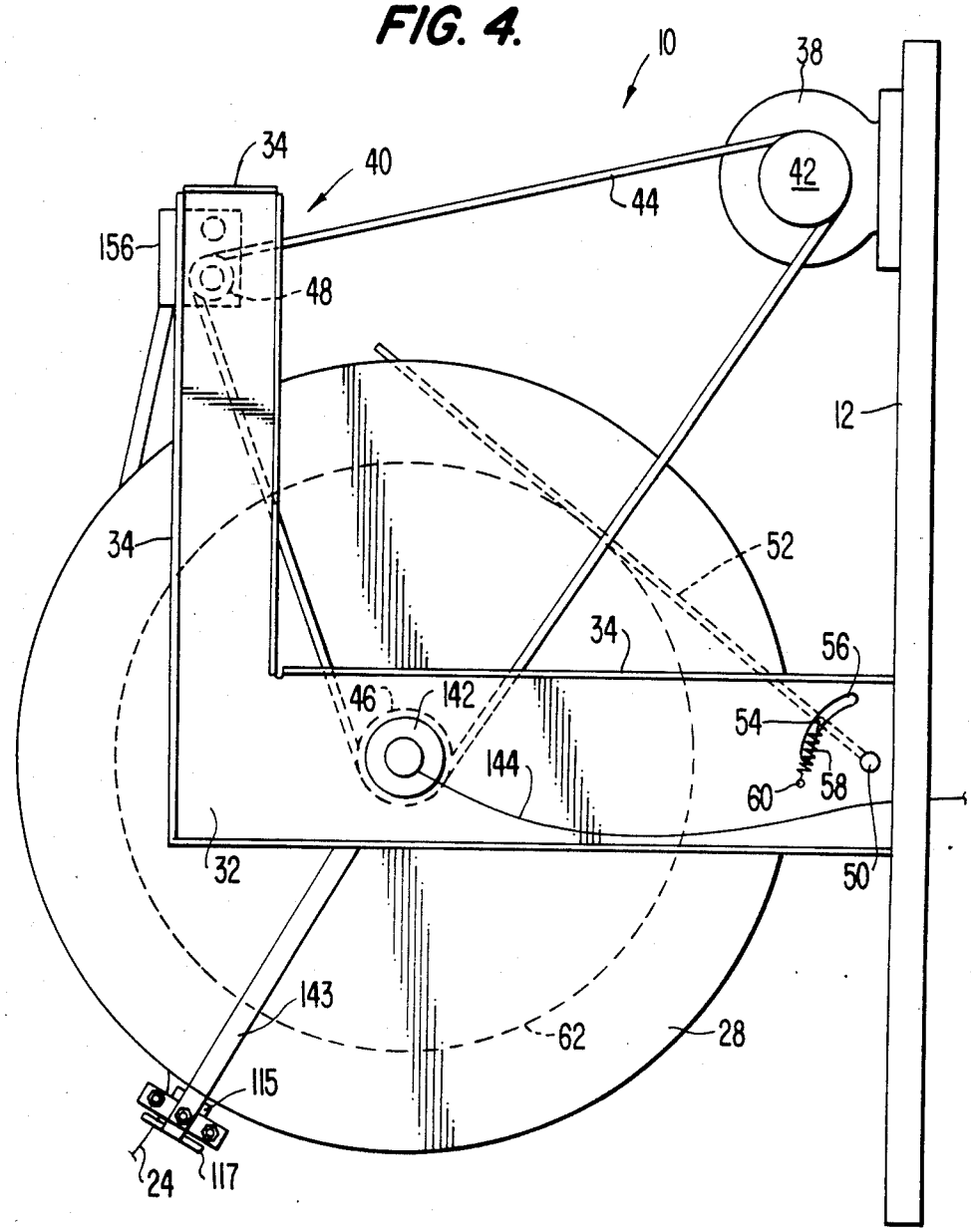

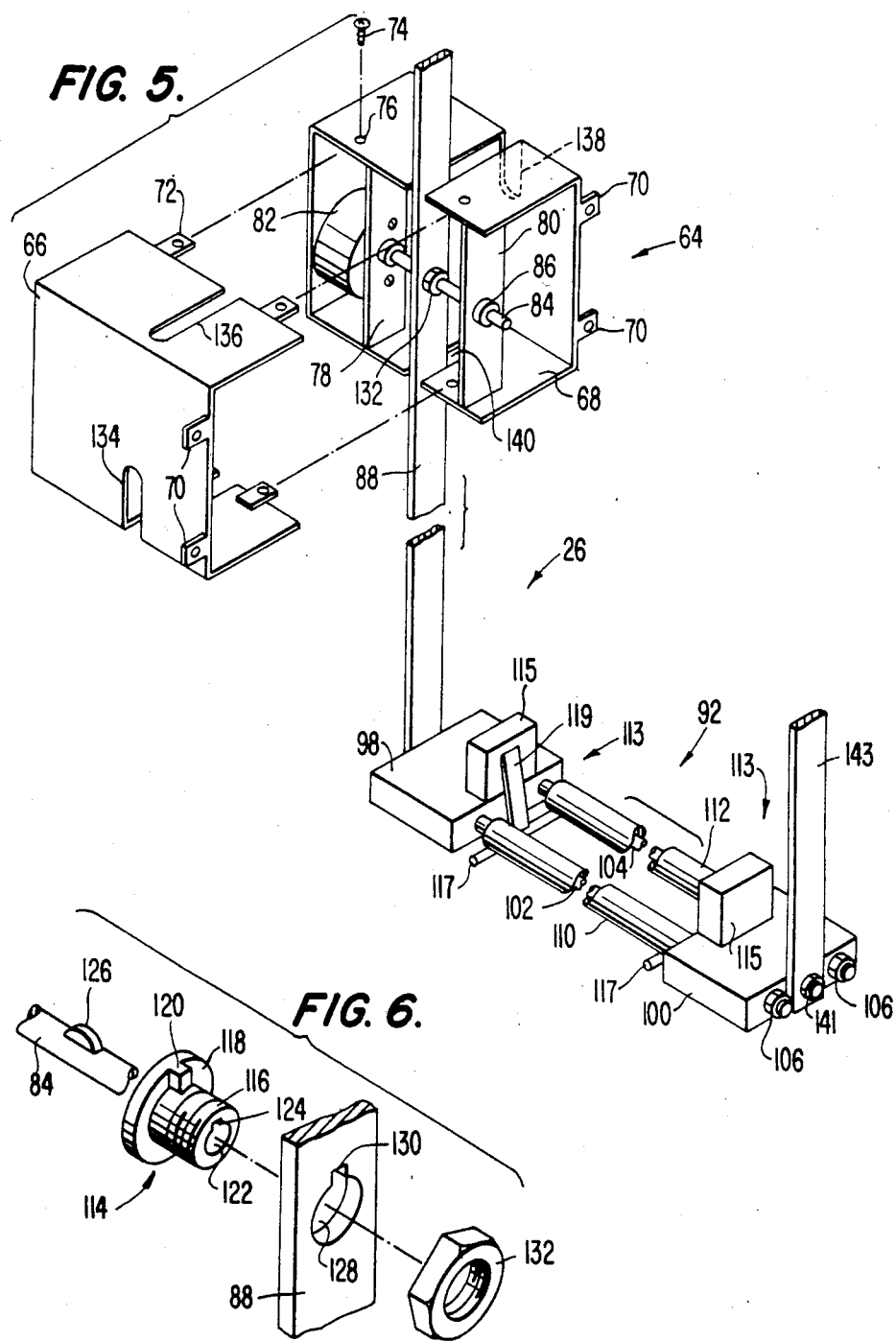

CABLE DISPENSING AND TAKE-UP APPARATUS

BACKGROUND OF THE INVENTION

The present invention relates to a dispensing and take-up apparatus for a flexible communications cable, and more particularly to a motor-powered reel which can be attached to a movable member such as a vehicle or cart in order to automatically wind or unwind a flexible communications cable such as an optical fiber as the need arises during movement of the member.

Continuing improvements and optical fibers have made optical communications an increasing attractive alternative to communications via connecting wires or radio. Optical fibers are relatively delicate, however, and may be damaged by excessive tension or bending stresses even if they are clad with a protective sheathing. This delicacy hampers the use of fiber communications in some situations. For example, the driver of a vehicle may be unable to spare the attention that is necessary to ensure that the fiber is being dispensed or taken-up without undue stress, or a worker in a hazardous environment such as a radioactive region may be unable to tolerate the delay imposed by manually monitoring the dispensing and taking-up of an optical fiber. Moreover, in some situations, such as a remotely controlled vehicle, a human operator may not be available to monitor the winding and unwinding of fiber.

SUMMARY OF THE INVENTION

Accordingly, an object of the invention is to provide an apparatus for attachment to a movable member such as a vehicle to automatically dispense a flexible communications cable or take it up as the member moves over the surface.

Another object of the present invention is to provide an apparatus for automatically dispensing and taking-up a communications cable while applying minimal stress to it.

Another object of the invention is to provide an apparatus for attachment to a vehicle to automatically dispense or take-up a communications cable as the vehicle moves, the dispensing or taking-up action being independent of the motion of the vehicle so that any extra slack or tension in the cable is automatically accommodated.

Another object of the present invention is to provide an automatic cable dispensing and taking-up apparatus which can be attached to a vehicle and which provides slack in the cable that has been dispensed as the vehicle moves along a path, the slack lowering the risk that the cable might become trapped by an obstacle so that it cannot be retracted on the return trip.

Another object of the present invention is to provide an apparatus for attachment to a vehicle in order to automatically dispense and take-up cable while permitting communication via the cable as the vehicle moves.

Another object of the present invention is to provide an apparatus for attachment to a vehicle in order to automatically dispense and take-up cable without imposing constraints on the vehicle's movement, the apparatus being capable of dispensing cable regardless of whether the dispensed cable trails behind the vehicle or lies beneath the vechicle.

These and other objects are attained by providing an apparatus which includes a reel about which a flexible communications cable such as an optical fiber can be wound. The reel is rotatably mounted on a member that moves over a surface, and a portion of the cable extends between the reel and the surface. This cable portion passes through an aperture provided by a pivotably mounted tension control arm, the angular position of the tension control arm being responsive to the position of the cable portion that extends between the reel and the surface. The angular position is detected and used to control a motor which unwinds additional cable from the reel when the angular position exceeds a first angle and which winds additional cable onto the reel when the angular position is less than a second angle. Thus, the reel dispenses additional cable to relieve excess tension or takes-up surplus cable to avoid excessive slack.

BRIEF DESCRIPTION OF THE DRAWINGS

FIG. 4 is a right side elevational view of the apparatus without its cover;

FIG. 5 is an exploded perspective view, partially broken away, of the tension control arm and position sensor;

FIG. 6 is an exploded perspective view illustrating features of FIG. 5;

DESCRIPTION OF THE PREFERRED EMBODIMENT

Figure 1:
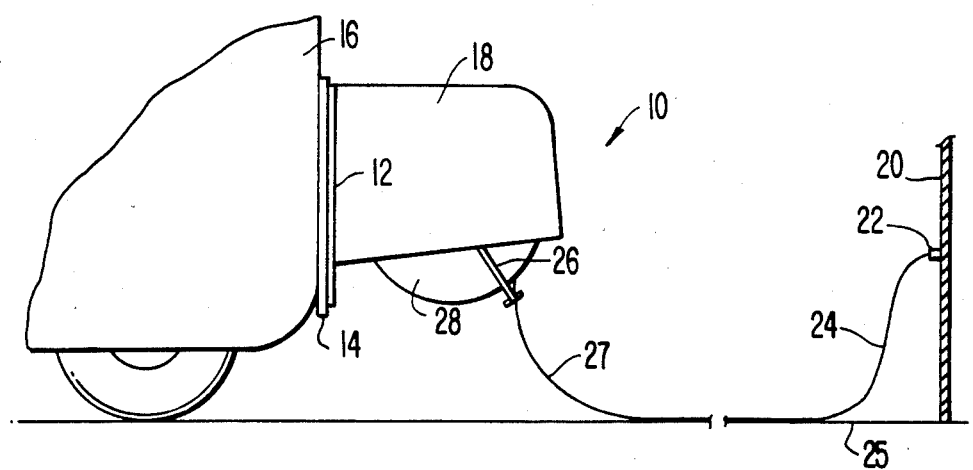
FIG. 1 is a side view schematically illustrating a vehicle laying optical fiber with the aid of the automatic dispensing and take-up apparatus of the present invention.

With initial reference to FIG. 1, the communications cable dispensing and take-up apparatus 10 of the present invention includes a support such as backboard 12 which is removably affixed to mounting rails 14. Mounting rails 14 are, in turn, welded to the rear of a movable member such as electrically powered vehicle 16. Apparatus 10 is illustrated in FIG. 1 with its protective cover 18, which is omitted from the remaining Figures.

Reference number 20 schematically illustrates a stationary panel such as a housing for communication equipment. During use of apparatus 10, connected 22 at one end of a flexible communications cable such as optical fiber 24 is connected to an appropriate optical socket (not illustrated) in panel 20 and the operator of vehicle 16 then drives away, depositing fiber 24 on surface 25. The resulting tension on fiber 24 is sensed by tension control arm 26, which responds to the position of the portion 27 of fiber 24 that rises from surface 25 as will be described, and fiber reel 28 is driven to dispense additional fiber as needed or to take-up the slack. The operator of vehicle 16 is thus free to drive to his destination without having to monitor or control the laying-out of fiber, or he might proceed on an exploratory mission without a firm destination in mind. As will be described apparatus 10 permits communication via fiber 24 while it is being dispensed or taken-up, so that the operator of vehicle 16 can communicate, as he proceeds, with personnel at the stationary location. Moreover this communication-while-underway feature permits vehicle 16 to be replaced by a remotely controlled vehicle that is driven not by an operator within vehicle 16, but by an operator at the stationary location. Finally it should be noted that, while vehicle 16 has been described as electrically powered, a movable member such as a cart that is pushed by an operator could be used instead.

Figure 2:
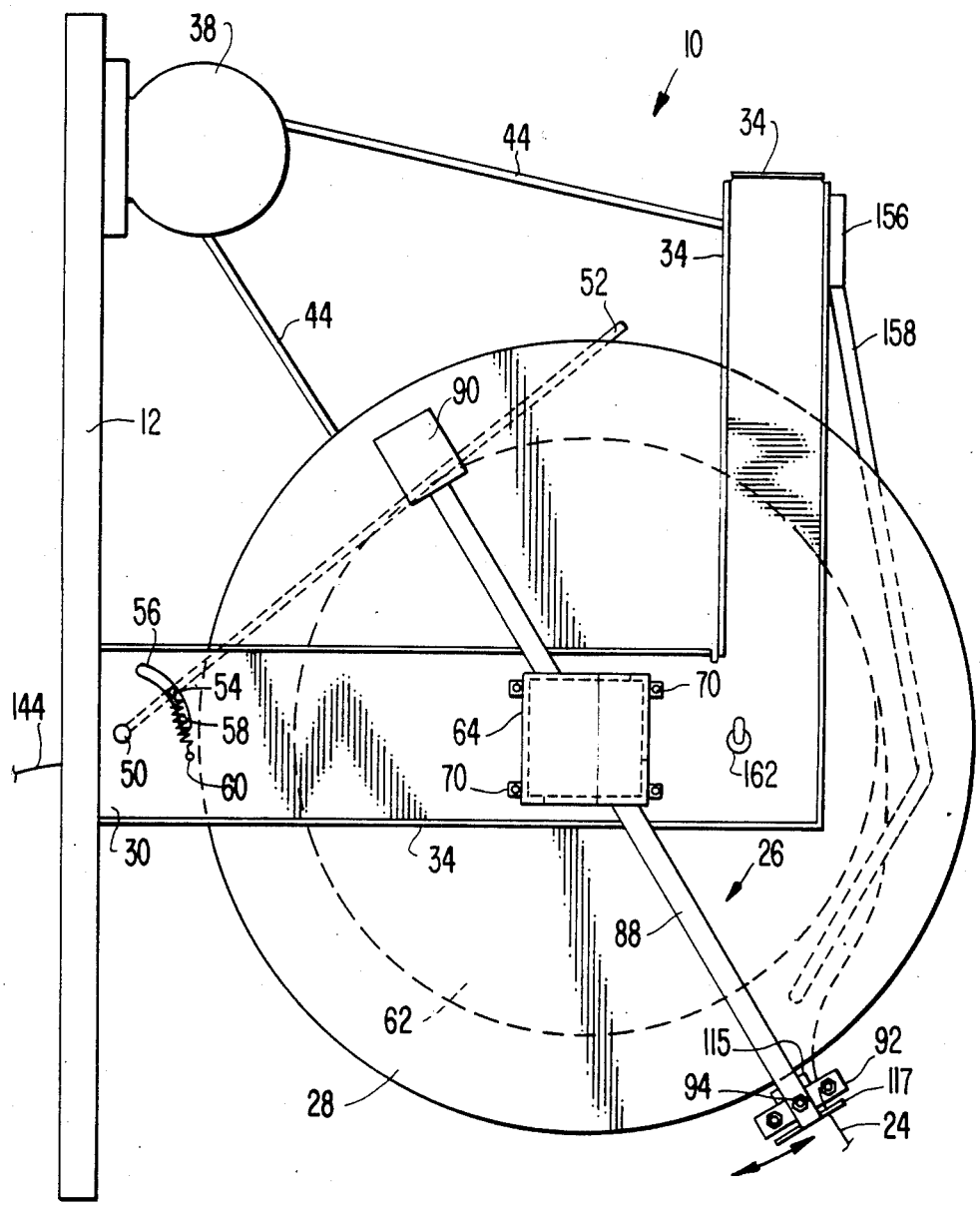
FIG. 2 is a left side elevational view of the automatic dispensing and take-up apparatus without its cover.
Figure 3:
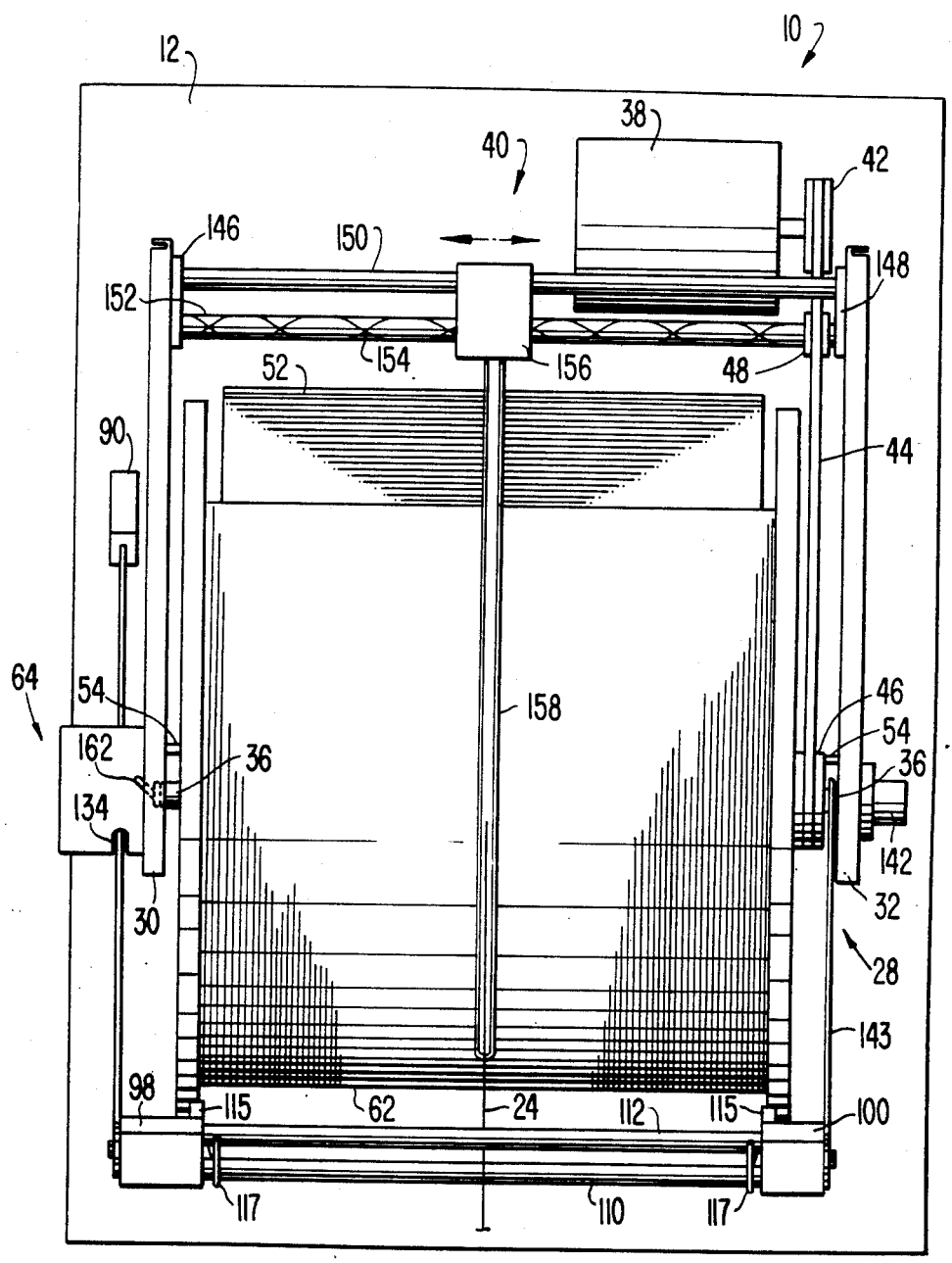
FIG. 3 is a front elevational view of the apparatus without its cover.

With reference next to FIGS. 2–4, apparatus 10 includes a left mounting bracket 30 and a right mounting bracket that are attached to backboard 12 at spaced apart positions. Brackets 30 and 32 are made of metal and are provided with peripheral flanges 34, which impart rigidity. A pipe 36 which serves as the axle of reel 28 is rotatably mounted between brackets 30 and 32, reel 28 being affixed to pipe 36.

A gear motor 38, that is, a motor with built-in reduction gearing, is mounted on backboard 12 to provide power for rotating reel 28 and operating level-winding mechanism 40. Gear motor 38 has a shaft to which pulley 42 is attached. Belt 44 extends around pulley 42, pulley 46 affixed to pipe 36, and pulley 48 of level-winding mechanism 40.

With continuing reference to FIGS. 2–4, rod 50 is pivotably mounted between the horizontal portions of brackets 30 and 32. Plate 52 having pegs 54 is affixed to road 50, pegs 54 extending through slots 56 in brackets 30 and 32. Springs 58 extend between pegs 54 and mounting posts 60 affixed to brackets 30 and 32. It will be apparant that plate 52 is pivotable about rod 50 and is biased by springs 58 against the wound portion 62 of fiber, that is, the portion of fiber 24 that is wound around reel 28. Plate 52 is lightly pressed against portion 62 in order to keep the fiber from unraveling.

With reference next to FIGS. 2 and 5, position sensor 64 includes housing portions 66 and 68 having mounting tabs 70 by which the housing is screwed to the horizontal portion of bracket 30. Portion 66 additionally has tabs 72 which are positioned to receive screws 74 extending through holes 76 in portion 68 in order to secure one housing portion to the other. Plates 78 and 80 are mounted parallel to one another within housing portion 68. Potentiometer 82 is mounted to plate 78 and has a shaft 84 which rotatably extends through bearing 86 in plate 80. Shaft 84 is disposed coaxially with respect to pipe 36 but is rotatable with respect thereto.

With continuing reference to FIGS. 2 and 5, tension control arm 26 includes a rod 88 having a counterweight 90 attached to one end thereof and a roller assembly 92 attached to the other end thereof by a bolt 94. Roller assembly 92 includes blocks 98 and 100, elongated bolts 102 and 104 which extend through openings in blocks 98 and 100 and which have threaded ends to receive nuts 106, and roller sleeves 110 and 112 disposed around bolts 102 and 104 respectively. Blocks 98 and 100 and sleeves 110 and 112 define an elongated aperture through which fiber 24 passes. Side-tension detectors 113 are provided at either end of this aperture, each detector including a microswitch 115 mounted on the respective block 98 or 100 and a fiber contact bar 117 affixed to the actuator arm 119 of the microswitch.

With reference next to FIGS. 5 and 6, mounting member 114 has a threaded portion 116 and a shoulder portion 118 from which key 120 extends. Extending through member 114 is a bore 122 having a keyway 124 to receive key 126 on shaft 84 of potentiometer 82. If potentiometer 82 is provided with a split shaft instead of a solid one, as illustrated, key 126 may be replaced by an element which is lodged in the split. Rod 88 has an opening 128 with a keyway 130 to receive key 120. Nut 132 is screwed to portion 116 in order to affix rod 88 to shaft 84. Since rod 88 is keyed to member 114 which is in turn keyed to shaft 84, it will be apparent that position sensor 64 rotatably mounts tension control arm 26 and that angular movement of arm 26 is conveyed to potentiometer 82 of sensor 64. Slots 134 and 136 in housing portion 66 communicate with slots 138 and 140 in housing portion 68 in order to permit unimpeded movement of rod 88. In order to increase the rigidity of arm 26 and to prevent flexing, bolt 141 secures one end of rod 143 to block 100; the other end of rod 143 is provided with a bearing (not illustrated) through which pipe 36 rotatably extends.

Returning to FIG. 4, rotary optical coupler 142 is affixed to the horizontal portion of right mounting bracket 32 at a position coaxial with respect to pipe 36. Suitable rotary optical couplers are known in the art and are commercially available, for example, from Litton Fiber Optic Products, 1212 North Main Street, Blacksburg, Va. 24060. The inner end (not illustrated) of the fiber 24 that is wound on reel 28 extends through pipe 36 to coupler 142, which optically connects fiber 24 to optical fiber 144. Fiber 144 extends through an opening (not illustrated) in backboard 12 to optical communication equipment (not illustrated) in vehicle 16. It will thus be apparent that optical coupler 142 permits communication via fibers 24 and 144 even while fiber 24 is being dispensed or taken-up.

Turning next to FIG. 3, level-winding mechanism 40 includes a mounting plate 146 which is affixed to the vertical portion of mounting bracket 30 and a mounting plate 148 which is attached to the vertical portion of mounting bracket 32. Guide shaft 150 and shaft 152 having a continuous spiral goove 154 are journaled for rotation by plates 146 and 148. Pulley 48 is affixed to shaft 152. Carrier member 156, from which fiber guide 158 extends, is movably mounted on shafts 150 and 152 and is provided with a tongue (not illustrated) which engages groove 154. It will be apparent that motor 38 rotates reel 28 and shaft 152 in unison and that groove 154 oscillates carrier member 156 back and forth in the manner of a fishing reel in order to keep the wound portion 62 of fiber 24 relatively flat.

It should be noted that level winding mechanism 40 is needed only when reel 28 is relatively wide, in order to accommodate a relatively long length of fiber 24. When shorter lengths of fiber are needed the reel can be narrowed and provided with a core that is hyperbolic in cross section. Such a reel would have a natural tendency to maintain windings that are fairly evenly distributed.

Returning to FIG. 1, it is the angular position of tension control arm 26 that determines whether additional fiber should be dispensed from reel 28, whether surplus fiber should be taken-up by reel 28, or whether reel 28 should remain quiescent. If vehicle 16 is driven away from panel 20, the tension in fiber 24 is increased and tension control arm 26 is therefore rotated in the counter-clockwise direction with respect to FIG. 1. Additional fiber should be dispensed in order to relieve the tension and permit vehicle 16 to continue without breaking fiber 24. Should vehicle 16 back toward panel 20, on the other hand, the increased slack would permit arm 26 to fall (that is, move clockwise in FIG. 1), indicating that the surplus fiber 24 should be taken up by reel 28. These are not the only conditions which should be considered, however, since under unusual conditions portion 27 of fiber 24 may extend toward vehicle 16 instead of trailing behind it. An unusual situation such as this might arise, for example, if vehicle 16 undergoes a U-turn, and the body of vehicle 16 lies between apparatus 10 and the route of fiber 24 that is already on surface 25. In an unusual situation such as this, increased fiber tension would rotate arm 26 clockwise past its vertical position, indicating that additional fiber should be unwound in order to decrease the tension.

Figure 7:
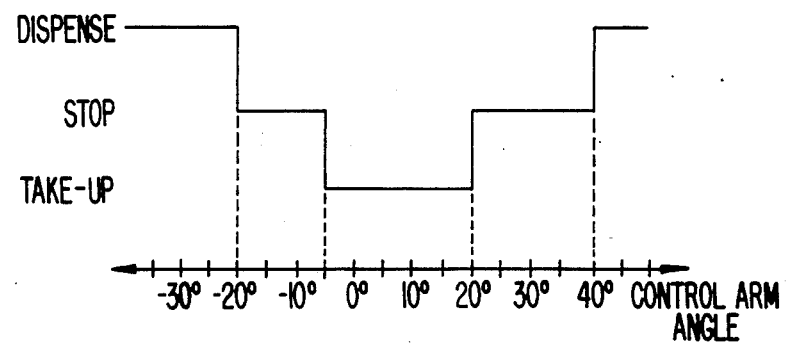
FIG. 7 is a graph which illustrates reeling action as a function of the tension control arm angle.

Suitable operation can be obtained by on-off control of motor 38. In FIG. 7, 0° corresponds to the vertical position of control arm 26 in FIG. 1. Positive angles indicate that arm 26 is rotated counter-clockwise from the vertical position, and negative angles indicate that arm 26 has been rotated in the counter-clockwise direction from the vertical position. The particular angles illustrated in FIG. 7 are provided for purposes of example only, but it should be noted that above a certain control arm angle (such as 40°) and below a certain control arm angle (such as −20°), reel 28 should be actuated to dispense additional fiber. This can be accomplished by connecting motor 38 to a battery in order to rotate the motor in a "dispense" direction. When the control arm angle lies between two intermediate values (such as −5° and 20°), the battey connections can be reversed to take-up slack fiber. Between the take-up and dispense angular values are stop zones, where motor 38 is disconnected from the battery. A circuit for achieving such operation is illustrated schematically in FIG. 8.

Figure 8:
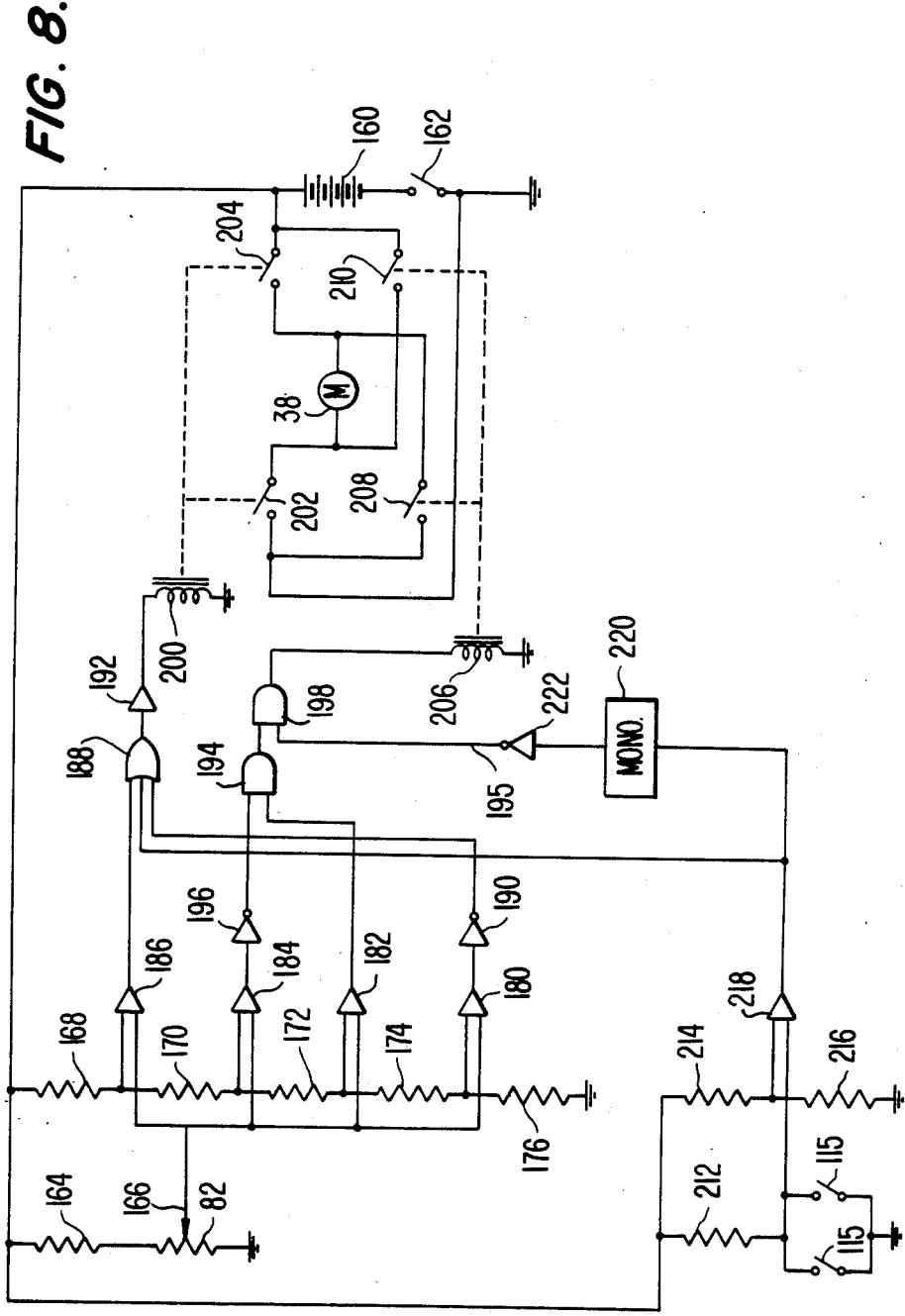
FIG. 8 is a schematic diagram of a motor control circuit.

In FIG. 8, a battery 160 for powering motor 38 is connected to ground via a switch 162, which is mounted on a readily excessible portion of mounting bracket 30 (see FIG. 2). In the remainder of this discussion it will be assumed that switch 162 is closed. Current limiting resistor 164 and potentiometer 82 of position sensor 64 are connected in series across the battery, and it will be apparent that the potential at wiper 166 of potentiometer 82 corresponds to the angle of control arm 26. Also connected across battery 160 is a biasing network consisting of resistors 168–176, which are connected in series. The values of these resistors are selected to obtain the desired control arm angles, as in FIG. 7, for controlling motor 38. Using the angular values in FIG. 7, for example, resistor 176 would have a resistance equal to that between wiper 166 and ground when the control arm angle is −20°; the sum of the resistances of resistors 174 and 176 would be equal to the resistance at wiper 166 when the control arm value is −5°; etc.

A first input of each of comparators 180–186 is connected to wiper 166. The second input of comparator 180 is connected to the junction of resistors 174 and 176; the second input of comparator 182 is connected to the junction of resistors 172 and 174; the second input of comparator 184 is connected to the junction of resistors 170 and 172; and, finally the second input of comparator 186 is connected to the junction of resistors 168 and 170. Each of comparators 180–186 turns ON when the potential at one input exceeds that at the other, and it will be apparent that each of comparators 180–186 turns ON at a characteristic angular position of potentiometer 82. One input of OR gate 188 is connected to the output of 186 and the other input is connected to the output of comparator 180 via inverter 190. Buffer 192 is connected to the output of gate 188, and it will be apparent that buffer 192 turns ON when the potential at wiper 166 is less than a predetermined minimum or greater than a predetermined maximum (corresponding, for example, to the −20° and +40° control arm angles in FIG. 7). One input of AND gate 194 is connected to the output of comparator 182 and the other input is connected to the output of comparator 184 via inverter 196. AND gate 198 has one input that is connected to the output of gate 194 and another input that is connected to conductor 195, which is digitally "high" (as will be discussed) except when a side-tension detector 113 is actuated. Unless a detector 113 is actuated, it will be apparent that gate 198 turns ON when the potential at wiper 166 exceeds a predetermined minimum (corresponding, for example, to the −5° control arm angle in FIG. 7) and is less than a predetermined maximum (corresponding, for example, to the +20° control arm angle in FIG. 7). It will be seen that buffer 192 turns ON when reel 28 is to dispense additional fiber, while gate 198 turns ON when excess fiber is to be taken up.

With continuing reference to FIG. 8, the output of buffer 192 is connected to the solenoid 200 of a relay having normally open contacts 202 and 204. These contacts close when buffer 192 is ON, thereby connecting battery 160 across motor 38. The output of gate 198 is connected to the solenoid 206 of a relay having normally open contacts 208 and 210. These contacts close when gate 198 is ON, thereby connecting motor 38 across battery 160 in a manner reversed from the connection when buffer 192 is ON. This reverse connection provides the take-up zone illustrated in FIG. 7. When neither buffer 192 nor gate 198 is ON, of course, motor 38 is disconnected, thereby providing the stop zones illustrated in FIG. 7.

Side-tension detectors 113 (see FIG. 5) are actuated in unusual situations, when fiber 24 is pulled sharply to one end or the other of the slot provided by roller assembly 92. This may occur, for example, if vehicle 16 (FIG. 1) makes a sharp 90° turn and fiber 24 is stretched in the direction of the axis of reel 28. In this situation tension control arm 26 (FIG. 1) behaves erratically since there is fiber tension but little or no torque to cause rotation of arm 26 one way or the other. Tension control arm 26 is typically in its 0° position (i.e., vertical) during a sharp turn, and the increased side-ways fiber tension does not smoothly move it to a dispense mode.

To cure this problem switches 115 of detectors 113 are connected between ground and the power source by pull-up resistor 212. Equal-valved resistors 214 and 216 are connected in series between ground and the power source, so that the intermediate connection point between resistors 214 and 216 is maintained at half of the supply voltage. One input of comparator 218 receives this voltage, while the second input is connected to the intermediate connection point between switches 115 and resistor 212. Since the potential sensed by the second input of comparator 218 is the supply voltage unless a switch 115 is closed, in which case the second input is grounded, it will be apparent that comparator 218 is OFF except when fiber 24 is pulled against one of the side-tension detectors 113. When a detector 113 is actuated, however, comparator 218 turns ON, thereby turning gate 188 and buffer 192 ON so that addition fiber is dispensed regardless of the angular position of arm 26. Monostable multivibrator 220 is triggered by the positive-going edge when comparator 218 turns ON, and the output of multivibrator 220 remains digitally "high" for two seconds (for example). The output is inverted by inverter 222 so that conductor 195 becomes digitally "low" and gate 198 turns OFF regardless of the angular position of arm 26. Thus for two seconds after actuation of a side-tension detector 113, additional fiber is dispensed even if the angular position of arm 26 is such that reel 28 would otherwise be in its take-up mode. During this two second interval the fiber becomes slack and both of switches 115 open, and accordingly it will be apparent that buffer 192 and gate 198 cannot both be ON simultaneously. Tension control arm 26 resumes its normal operation as vehicle 16 continues on its way after making the turn.

In order to avoid complicating FIG. 8, diodes for controlling inductive spikes generated when motor 38 is switched OFF have not been illustrated. In situations where they are needed such protective diodes may be connected, however, through the normally closed contacts (not illustrated) of the relays. For spike protection when contacts 202 and 204 are opened, for example, a back-biased diode could be connected across motor 38 via a normally closed contact of the relay which includes normally open contacts 208 and 210. This diode would, of course, be removed from the circuit when contacts 208 and 210 are closed.

It will be understood that the above description of the present invention is susceptible to various modifications, changes, and adaptations, and the same are intended to be comprehended within the meaning and range of equivalence of the appended claims. In particular it will be understood that the invention could be employed to dispense and take-up a flexible communications cable other than an optical fiber. Examples include coaxial cables, twisted pairs, etc.

What is claimed is:

1. An apparatus for attachment to a movable member to automatically dispense a flexible communications cable onto a surface or take-up the cable from the surface as the member moves over the surface, comprising:
   a reel about which the cable can be wound;
   mounting means for rotatably mounting said reel on the movable member, said reel being positioned above the surface and a portion of the cable extending between the reel and the surface, said cable portion having a position that is changeable with respect to said reel;
   a tension control arm having an aperture through which said cable portion passes, said tension control arm being mounted for pivotal motion so that said aperture is movable through an arc having a lowermost position, said aperture being movable in both a clockwise direction from said lowermost position and a counterclockwise direction from said lowermost position, said aperture having an angular position with respect to said lowermost position that is responsive to the position of said cable portion;
   detecting means for detecting the angular position of said tension control arm;
   a motor operatively connected to said reel to rotate said reel; and
   motor control means responsive to said detecting means for controlling said motor to unwind additional cable from said reel when the angular position of said aperture exceeds a first predetermined angle clockwise of said lowermost position, to unwind additional cable from said reel when the angular position of said aperture exceeds a second predetermined angle counterclockwise of said lowermost position, and to wind cable onto said reel when the angular position of said aperture lies in a predetermined take-up region disposed between said first and second predetermined angles.

2. The apparatus of claim 1, wherein said cable is an optical fiber and wherein said mounting means comprises a pipe extending through said reel, the fiber wound on said reel having an inner end that is disposed within said pipe, and a bracket rotatably supporting an end of said pipe, and further comprising an additional optical fiber and coupler means mounted on said bracket for optically connecting said additional fiber to said inner end of fiber within said pipe.

3. The apparatus of claim 1, wherein said reel has an axis, wherein said mounting means comprises a bracket and means for rotatably supporting said reel on said bracket with the axis of said reel extending through said bracket, and wherein said tension control arm is mounted adjacent said bracket for pivoting movement about the axis of said reel.

4. The apparatus of claim 3, wherein said detecting means comprises a potentiometer having a shaft, and means mounting said potentiometer to said bracket with the axis of said reel extending through said shaft, said tension control arm being affixed to said shaft.

5. The apparatus of claim 1, wherein said reel has a horizontally disposed axis and wherein said tension control arm comprises an elongated rod having an axis, said rod being mounted adjacent said reel for pivoting movement about the axis of said reel, the axis of said rod being substantially perpendicular to the axis of said reel.

6. The apparatus of claim 5, wherein said rod has first and second ends and wherein said tension control arm further comprises a counterweight mounted on said rod adjacent the first end thereof and an elongated roller assembly mounted on said rod adjacent the second end thereof, said roller assembly having an axis that is substantially parallel to the axis of said reel.

7. The apparatus of claim 6, wherein said roller assembly comprises a pair of spaced-apart rollers, said aperture of said tension control arm lying between said rollers.

8. The apparatus of claim 7, wherein said aperture is elongated, further comprising a side-tension detector mounted on said tension control arm at either end of said aperture, and wherein said motor control means further comprises means for unwinding additional cable from said reel if either side-tension detector is actuated.

9. The apparatus of claim 1, further comprising levelwinding means attached to said mounting means and operatively connected to said motor for evenly distributing cable wound on said reel.

10. The apparatus of claim 9, further comprising a plate pivotably secured to said mounting means and means for biasing said plate against cable wound on said reel.

11. The apparatus of claim 1, wherein said predetermined take-up region extends from a third predetermined angle clockwise of said lowermost position to a fourth predetermined angle counterclockwise of said lowermost position, said third predetermined angle being smaller than said first predetermined angle and said fourth predetermined angle being smaller than said second predetermined angle, and wherein said motor control means further comprises means for stopping said motor when the angular position of said aperture is between said first and third predetermined angles and when the angular position of said aperture is between said second and fourth predetermined angles.

12. The apparatus of claim 11, wherein said motor control means comprises means for connecting said motor to a source of electric power, means for reversing the connection, and means for disconnecting said motor from said source of electric power.

13. The apparatus of claim 1, wherein said movable member is a vehicle and said reel has an axis, wherein said mounting means comprises a first and second brackets, means for mounting said brackets to said vehicle at spaced apart positions, and means for rotatably mounting said reel between said brackets so that the axis of said reel is horizontally disposed, and wherein said tension control arm includes two perpendicular legs, said aperture being in one leg and the other leg being operatively connected to said first bracket for pivoting movement about the axis of said reel.

14. The apparatus of claim 13, wherein said detecting means comprises a potentiometer having a shaft, a housing on which said potentiometer is mounted, and means for mounting said housing on said first bracket with the axis of said reel running through said shaft, said other leg of said tension control arm being operatively connected to said first bracket by being attached to said shaft.

15. The apparatus of claim 14, wherein said one leg of said tension control arm comprises a pair of spaced-apart elongated members having axes that are substantially paralled to the axis of said reel, said aperture of said tension control arm lying between said elongated members.

16. The apparatus of claim 13, wherein the cable is an optical fiber and the fiber wound on said reel has an inner end, wherein said means for rotatably mounting said reel between said brackets comprises a pipe to which said reel is affixed, the axis of said reel lying in said pipe and said inner end being disposed in said pipe, and further comprising an additional optical fiber having first and second ends, and coupler means mounted on said second bracket for optically connecting the first end of said additional fiber to said inner end, the second end of said additional fiber being positioned in said vehicle.

17. The apparatus of claim 16, wherein said predetermined take-up region extends from a third predetermined angle clockwise from said lowermost position to a fourth predetermined angle counterclockwise of said lowermost position, said third predetermined angle being smaller than said first predetermined angle and said fourth predetermined angle being smaller than said second predetermined angle, and wherein said motor control means further comprises means for stopping said motor when the angular position of said aperture is between said first and third predetermined angles and when the angular position of said aperture is between said second and fourth predetermined angles.

18. The apparatus of claim 17, wherein said motor control means comprises means for connecting said motor to a source of electric power, means for reversing the connection, and means for disconnecting said motor from said source of electric power.

19. The apparatus of claim 17, further comprising level-winding means mounted between said brackets and operatively connected to said motor for evenly distributing fiber wound on said reel, and a plate pivotably mounted on said brackets and biased against fiber wound on said reel.

20. The apparatus of claim 17, wherein one of said first and second predetermined angles is more than 30° clockwise of said lowermost position and the other of said first and second predetermined angles is less than 30° counterclockwise of said lowermost position.

* * * * *